Nov. 13, 1928.                    A. BELER                    1,691,908
                             THERMOSTATIC VALVE
                             Filed April 5, 1923
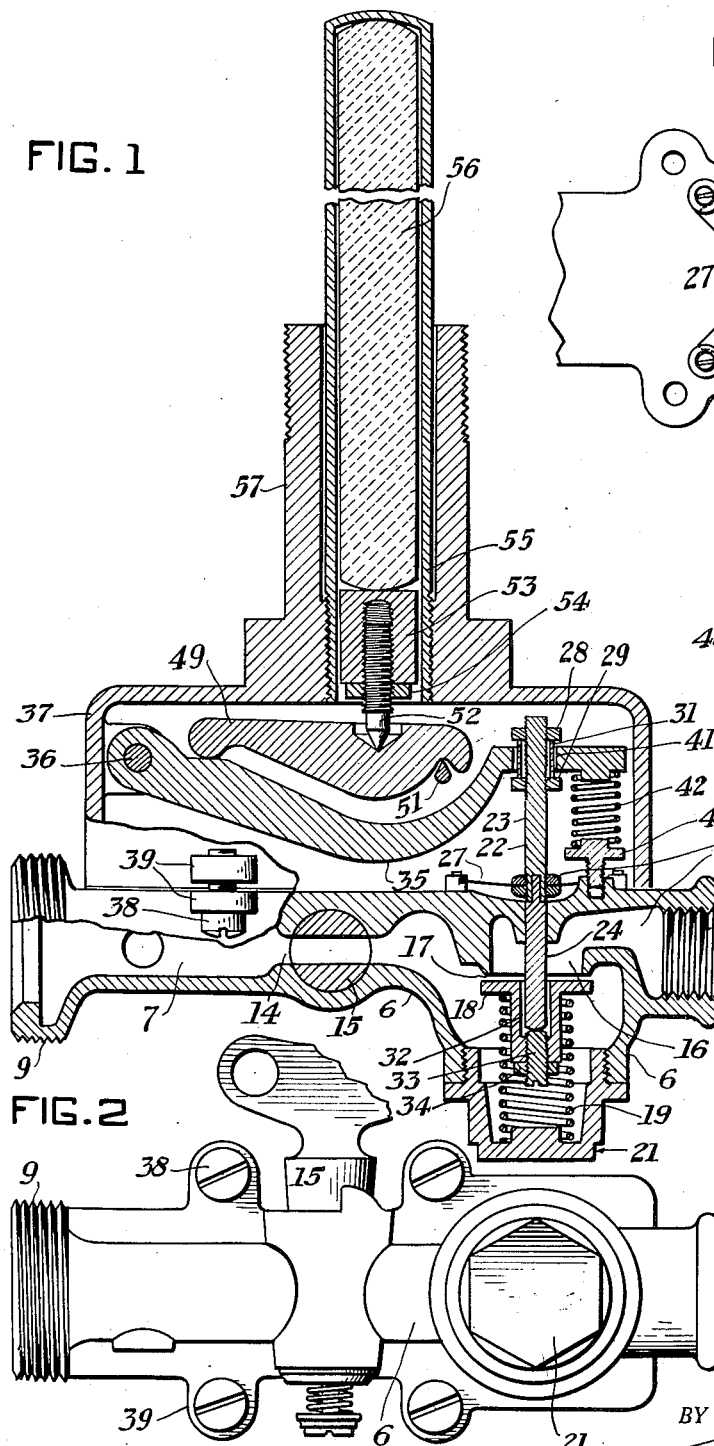

Patented Nov. 13, 1928.

1,691,908

UNITED STATES PATENT OFFICE.

ADOLF BELER, OF PITTSBURGH, PENNSYLVANIA; ELIZABETH BELER EXECUTRIX OF SAID ADOLF BELER, DECEASED.

THERMOSTATIC VALVE.

Application filed April 5, 1923. Serial No. 630,019.

REISSUED

My invention relates to thermostatic valves and particularly to valves for controlling the supply of gas or other heating agent to water heaters, furnaces and the like.

Gas burners are usually designed to operate most efficiently on a predetermined quantity of gas at a predetermined pressure, and it has been found that greater fuel economy is obtained in a system employing a thermally-controlled valve if the valve is opened and closed with a quick action, than if the valve is permitted to open and close slowly as the thermal-responsive element is gradually heated or cooled for, during such slow opening and closing movement of the valve, the burner is not operating at its maximum efficiency, due to gradual changes in the quantity and pressure of the gas.

One object of my invention is to provide a simple thermally-controlled valve mechanism wherein the fuel supply valve is actuated to open and to closed positions with a snap action in response to predetermined movements of the thermal-responsive element for the above stated purpose.

Another object of my invention is to provide a thermostatic valve, having the above characteristics, that may be applied to water heaters, furnaces, ovens and, in fact, any apparatus requiring temperature control of a heating agent.

Another object of my invention is to provide a thermostatic valve wherein the mechanism for actuating the valve is of simple and durable construction and wherein the spring for actuating the valve with a snap action may be adjusted to meet different temperature control requirements.

Another object of my invention is to provide a thermal responsive valve with a snap action spring of the over-center type that is inexpensive to manufacture, that is uniform and reliable in operation and which is readily adjustable.

Another object of my invention is to provide a thermostatic valve wherein the valve is so connected to the thermal-responsive element that it is moved independently of the said element in response to predetermined movements thereof, and wherein adjustments may readily be made to vary the range of the device or the temperatures at which the valve operates to open or close the gas supply.

These and other objects, that will be made apparent throughout the further description of my invention, are attained by means of the apparatus hereinafter described, and illustrated in the accompanying drawings, wherein:

Figure 1 is a longitudinal section through the thermostatic valve;

Fig. 2 is a bottom plan view of the mechanism shown in Fig. 1;

Fig. 3 is a top plan view of a fragment of the valve casing showing the over-center, snap action spring employed in the valve mechanism shown in Fig. 1;

Fig. 4 is a fragmental sectional view of a detail of the over-center spring, and Fig. 5 is an elevational view of a water heater to which the improved thermostatic valve is applied.

Referring to the drawings, the apparatus includes a gas valve casing 6 having a fluid supply chamber 7 and a fluid delivery chamber 8, the former being provided with a threaded nipple 9 for receiving a union connection of the gas supply pipe 11 and the latter being provided with an internally threaded sleeve 12 for receiving the gas delivery pipe 13 (see Fig. 5). The gas delivery chamber is provided with a restricted passage 14 that is controlled by a plug valve 15 by means of which the supply of gas to the gas chamber may be manually controlled.

Communication is established between the supply chamber 7 and the delivery chamber 8 by means of a port or passage 16 that is surrounded by a valve seat 17 that cooperates with a valve 18 for closing the port 16. The valve is normally yieldingly held in closed position by a helical spring 19 which engages the valve and is supported upon a removable cap 21 threaded into the casing 6.

The valve 18 is moved to open position by a floating valve stem 22 that is made in two sections, an upper section 23 and a lower section 24 that telescopes, at its upper end, into a bore in the lower end of the section 23. The ends of the section 23 are threaded, the lower end thereof being adapted to receive a pair of locking nuts 25 and 26 between which an over-center snap action spring 27 is clamped. The upper end of the stem section 23 is provided with a pair of adjustable nuts 28 and 29 between which a spacing sleeve 31 is clamped.

The lower end of the stem 22, constituted by the sections 23 and 24, extends into a bore 32 of the valve 18 and engages a threaded adjusting screw 33 that is locked in adjusted position by a nut 34. The adjusting screw regulates the degree of opening of the valve as a result of the action of the over-center spring 27.

The upper end of the valve stem 22 is connected to a thermal-responsive element or lever 35 that is pivoted on a shaft 36 extending transversely of a protecting casing 37 that is secured to the valve casing by means of screws 38 that engage lugs 39 on the casings. The free end of the lever 35 is provided with a hole 41 through which the sleeve 31 freely operates and it will be seen that a lost-motion connection is provided by the sleeve 31 which separates the nuts 28 and 29.

The free end of the lever 35 is normally biased upwardly by a helical spring 42 and the tension of the spring may be varied by adjustment of the threaded spring seat 43 that has threaded engagement with the upper wall of the casing 6.

The over-center spring 27 comprises a flat leaf spring in the form of a cross having four radial wings 44 each having a concave end edge that fits within a slot 45 cut in each of four lugs 46 that are attached to, or integral with, the casing 6 and which are equidistantly spaced about the axis of the stem 22, as indicated in Fig. 3. Each lug is provided with an adjusting screw 47 having a tapered end that engages the concave edge of the wings 44 and prevents rotary displacement of the spring.

The inclined surfaces of the pointed adjusting screws engage the ends of the wings 44 and confine them against radial expansion. It will be understood that, when the over-center spring 27 is properly adjusted, the wings 44 are bowed upwardly or downwardly, as indicated in Fig. 1, and that, when the stem 22 is moved upwardly or downwardly, the central portion of the spring is displaced first, thus forming an S curve in the wings because they cannot expand radially. When the center of the spring passes a predetermined point or plane, the wings reverse their position abruptly and move the stem either upwardly or downwardly with a snap action. Moving the screws inwardly against the ends of the wings 44 increases the resistance to movement of the stem and increases the velocity of movement of the stem after it has moved over center. It will be seen, therefore, that, by reason of the adjustability of the springs 42 and 27 and the position of the stem 22 with respect to the valve 18 and the thermal-responsive lever 35, the operation of the valve may readily be regulated to suit different operating conditions.

The thermal-responsive lever is actuated by a motion amplifying thermostatic device including a lever 49 that is pivoted, at one end, upon a knife edge fulcrum 51 and which bears, at its other end, upon the lever 35 at a point near the shaft 36. The lever 49 is actuated by an adjustable pivot pin 52 that is threaded into a metal plug 53 and locked thereto by a nut 54. The plug 53 is mounted for reciprocating movement within a copper tube 55 that has threaded engagement with the casing 37 and which is closed at one end. A porcelain rod 56 is disposed between the closed end of the tube 55 and the plug 53. The coefficient of expansion of the porcelain being less than that of the copper tube permits the pivot point to move toward the end of the tube in response to the pressure applied by the spring 42 through levers 35 and 49 and to thus permit the spring 19 to close the valve. Contraction of the tube 55 causes inward movement of the pin 52 and consequent movement of the lever 35 against the action of the spring 42 which results ultimately in opening movement of the valve 18.

The casing 37 is provided with a threaded extension 57 by means of which the thermostatic valve may be connected to a water or steam tank or pipe or to an oven or furnace, or other apparatus, the temperature of which it is desirable to control. As shown in Fig. 5, the device is connected to a water heater of the simple tank type wherein the expansion tube 56 extends into the tank 58. The delivery pipe 13 is connected to a gas burner 59 and the gas is lighted by a small pilot lamp 61 that burns continuously adjacent the burner.

Assuming that the valve is closed and the off-center spring is bowed upwardly and the lever 35 is in engagement with the nut 28, as the water in the heater cools, the tube 55 contracts and causes the lever 35 to move into engagement with the nut 29. Subsequent movement of the lever will cause the stem 22 to be depressed and to cause distortion of the off-center spring 27. However, no motion is imparted to the valve during this movement of the thermal-responsive lever 35 and the valve 18 remains closed until the center of the spring 27 is depressed over center, at which time the spring 27 will move the valve to full-open position with a snap action independent of movement of the lever 35. The spring 27 is stronger than the relatively weak spring 19 which serves only to close the valve 18 when permitted to do so by the upward movement of the stem 22. The adjustment screw 33 regulates the distance that the stem may move the valve 18. The farther in the screw is placed, the greater will be the opening of the valve.

When the gas is turned into the burner 59, it is lighted by the pilot lamp 61. As the temperature rises, the tube 55 expands and permits the relatively strong spring 42 to move the lever 35 upward. At this time, however, the nut 28 is spaced from the lever and permits of a predetermined movement of the lever without effecting movement of the stem.

When the lever 35 engages the nut 28, it begins to lift the stem and with it the center of the spring 27. The valve remains open, however, until the stem is moved and, when the spring 27 is moved over center, the stem will be moved away upward with a snap action, permitting the spring 19 to close the valve with a snap action and to hold it closed.

The temperature range of the device may, therefore, be controlled by the amount of lost-motion permitted between the lever 35 and the nuts 28 and 29 and by the adjustment of the spring 27 to increase or decrease the movement of the stem required to move the center of the spring over center or to cause it to reverse its position. It will be understood that the spring 42 is stronger than the spring 27 and may actuate it through the medium of the lever 35, and that the spring 27 is stronger than the spring 19 and is capable of forcing the valve open against the tension of the latter spring.

By reason of the several adjustments provided, the device is rendered applicable to a variety of applications without substitution of parts and the general construction is such as to readily enable inspection and repair.

While I have illustrated and described but one embodiment of my invention, it will be apparent to those skilled in the art that various changes, modifications, substitutions, additions and omissions may be made in the apparatus illustrated without departing from the spirit and scope thereof, as set forth in the appended claims.

I claim as my invention:

1. A thermostatic valve comprising a valve for controlling the delivery of a heating agent, a spring for normally yieldingly closing the valve, a thermal-responsive means having a lost-motion connection to the said valve for actuating the valve, a spring for normally yieldingly retaining the thermal responsive means in retracted position, and an over center spring for actuating the valve with a snap action in response to a predetermined movement of the thermal-responsive means.

2. A thermostatic valve comprising a valve for controlling the delivery of a heating agent, a thermal-responsive means having a lost-motion connection to the said valve for actuating the valve and a flat over center spring for actuating the valve with a snap action in response to a predetermined movement of the thermal-responsive means.

3. A thermostatic device comprising a heat-controlling element, a thermal-responsive means for actuating the heat-controlling element and an over center spring for actuating the heat-controlling element with a snap action in response to a predetermined movement of the thermal-responsive means comprising a leaf spring having its opposite ends adjustably confined between non-yielding supports for supporting it in flexed condition in either of two different positions.

4. A thermostatic device comprising a heat-controlling element, a thermal-responsive means for actuating the heat-controlling element and an over center spring for actuating the heat-controlling element with a snap action in response to a predetermined movement of the thermal-responsive means comprising a leaf spring having a plurality of radially projecting wings confined against radial expansion and for yieldingly supporting a portion of the spring connected to the thermal-responsive means in two different positions.

5. A thermostatic device comprising a heat-controlling element, a thermal-responsive means for actuating the heat-controlling element and an over center spring for actuating the heat-controlling element with a snap action in response to a predetermined movement of the thermal-responsive means comprising a leaf spring having a plurality of radially projecting wings adjustably confined against radial expansion and for yieldingly supporting a portion of the spring connected to the thermal-responsive means in two different positions.

6. A thermostatic valve comprising a casing having a fluid inlet chamber and a fluid outlet chamber provided with a port establishing communication between the chambers, a valve for closing the port, a spring for yieldingly moving the valve to closed position, a stem for the valve having a lost motion connection thereto, a thermal-responsive means for actuating the stem and an over center spring for moving the stem to open or to closed position with a snap action in response to a predetermined movement of the stem.

7. A thermostatic valve comprising a casing having a fluid inlet chamber and a fluid outlet chamber provided with a port establishing communication between the chambers, a valve for normally closing the port, a spring for yieldingly moving the valve to closed position, a thermal-responsive means for actuating the valve and an over center spring for moving the valve to open or to closed position with a snap action in response to a predetermined movement of the thermal-responsive means.

8. In a thermostatic valve, the combination with a valve for controlling the delivery of a heating agent and a thermal-responsive means, of a valve actuating stem having a lost-motion connection to the valve and thermal-responsive means and an over center spring for actuating the stem with a snap action in response to a predetermined movement of the thermal-responsive means.

9. In a thermostatic valve, the combination with a spring closed valve for controlling delivery of a heating agent and a thermal-responsive means, of a valve actuating stem controlled by the therml-responsive means and having a lost-motion connection to the valve for positively moving the valve to open position and an over center spring for moving the stem with a snap action in response to a predetermined movement of the thermal-responsive means.

10. In a thermostatic valve, the combination with a valve for controlling delivery of a heating agent, yielding means for normally moving the valve to closed position and a thermal-responsive means, of a stem controlled by the thermal-responsive means for moving the valve to open position and an off-center spring for moving the stem to two separate positions with a snap action, the said stem being relatively movable with respect to the valve and so positioned with respect thereto that it moves the valve to open position with a snap action when moved to the one position and permits the valve to be closed with a snap action when the stem is moved to its other position by the said spring.

In testimony whereof, I have hereunto subscribed my name this 31st day of March, 1923.

ADOLF BELER.